Jan. 23, 1968 J. K. BRAGG 3,365,584

CRYO-ELECTRONIC THRESHOLD COMPONENTS

Filed Dec. 16, 1964

Inventor:
John K. Bragg,
by John P. DeWitt
His Attorney.

United States Patent Office 3,365,584
Patented Jan. 23, 1968

3,365,584

CRYO-ELECTRONIC THRESHOLD COMPONENTS

John K. Bragg, Schenectady, N.Y., assignor to General Electric Company, a corporation of New York Filed Dec. 16, 1964, Ser. No. 418,812
1 Claim. (Cl. 307—211)

ABSTRACT OF THE DISCLOSURE

A superconducting threshold circuit having a superconducting tunneling element in shunt with a plurality of series-connected cryotron gates, each gate being of width selected in accordance with the weight to be assigned to signals furnished to a grid controlling that gate. The shunt circuit is energized from a constant current source. When the weighted total of input signals supplied to the grids is sufficient to raise the resistance and hence the voltage across the series-connected gates above a threshold value required to drive the tunneling element into conduction, an out-put signal is produced.

The present invention relates to threshold responsive components and particularly to such components operative in a superconducting environment.

A threshold component or circuit is one responsive to a plurality of inputs for providing an output when a predetermined number or combination of such inputs are present. The inputs may receive weights such that some are more effective than others in causing an output to occur. Circuits of this type are useable in computing systems wherein computing functions such as addition and substraction can be logically expressed in accordance with specified threshold functions.

Heretofore, threshold devices have frequently taken the form of plural input amplifier circuits and the like, for example a transistor amplifier biased such that a predetermined number of simultaneous inputs are required in order to cause the amplifier to conduct. It is a purpose of the present invention to provide a simplified and somewhat more economical threshold component. It is another purpose of the present invention to provide such a component operative at superconductive temperatures for securing thereto the advantages of miniaturization and a high circuit packing density.

In accordance with the present invention, a source of current is coupled across a superconducting tunnelling element having the properties of substantially non-current flow until a voltage of a specified value appears thereacross. A branch circuit coupled across the tunnelling junction diverts the current away from the tunnelling element until such voltage is caused to appear across the branch circuit. According to a particular embodiment of the invention, the branch circuit across the tunnelling element comprises cryotron gate means having plural cryotron grid means operatively associated therewith acting to introduce resistance into the branch circuit. When a sufficient or predetermined number or combination of grid means are actuated, the voltage across the branch and therefore the tunnelling element will rise to a value sufficient for causing current flow through the tunnelling element. Output cryotron gate means are disposed adjacent grid means in series with the tunnelling element and provide an output when current of a determined value begins to flow in such element.

Figure 1:
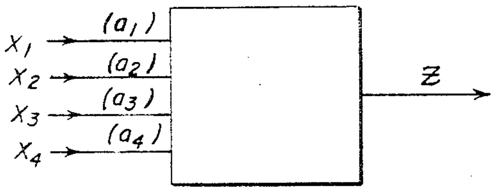
Figure 2:
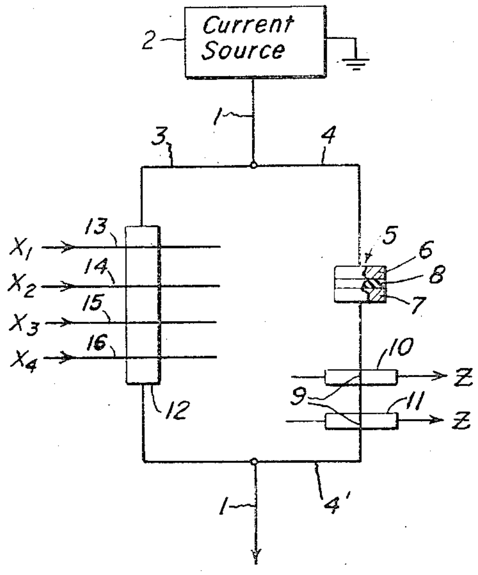
Figure 3:
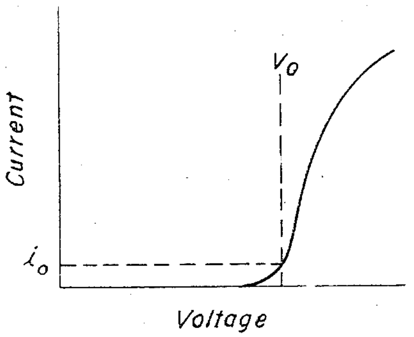
Figure 4:
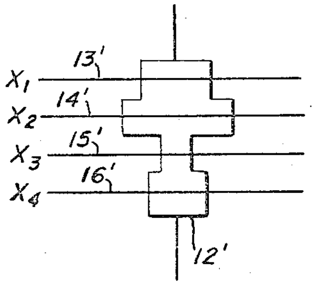

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like references refer to like elements and in which:

FIG. 1 is a generalized showing of a threshold component,

FIG. 2 is a schematic diagram of an embodiment of the threshold component in accordance with the present invention, FIG. 3 is a characteristic curve for a super-conductive tunnelling junction employed in accordance with the present invention, and FIG. 4 is a schematic representation of cryotron gate means disposed in parallel with the superconducting tunnelling junction for providing weighted inputs to the threshold circuit.

In general, a threshold device has the purpose of generating an output when a function of a plurality of inputs exceed a given value. The output of the threshold device can be determined by the relationship of the weighted sum of the variable inputs as follows:

$$z=1;\ \Sigma_i a_i x_i \geqq T$$
$$z=0;\ \Sigma_i a_i x_i \angle T$$

The $x_i$ are binary variables taking the values 0 or 1 and the $a_i$ are weights supplied thereto. In the simplest case, when the weights are all unity, the output is one when any number of inputs greater than or equal to T are one and the rest are zero.

FIG. 2 is a schematic diagram of an embodiment of the present invention formed of superconductors including coupling means 1 connected to a source of current 2 and acting to couple such current source to a first branch circuit 3 as well as a second branch circuit 4 in parallel therewith. The current is preferably of a constant value. The branch circuit 4 serially includes a tunnelling junction element 5 composed of a first conductor 6, a second conductor 7 and an exceedingly thin layer of insulation 8 therebetween. Such a tunnelling junction is disclosed and claimed in Patent No. 3,116,427, issued Dec. 31, 1963, to Ivar Giaever. During the operation of the device according to the present invention, at least one and preferably both of the conductors 6 and 7 are superconductors in a superconducting state. Branch circuit conductor 4 and extension thereof 4' are connected to conductors 6 and 7 respectively. Also serially included in branch 4 are one or more cryotron grids 9 disposed in operative relation to one or more cryotron gates 10 and 11. When a current of a given value flows in branch 4 and therefore in cryotron grids 9 the cryotron gates 10 and 11 are rendered resistive due to the magnetic field of the grid current in a manner understood by those skilled in the art. Output circuitry (not shown) may be connected in series with gates 10 and 11 showing an output due to the flow or non-flow of current therein in accordance with their superconductive or resistive states.

Branch circuit 3 in parallel with branch 4 serially includes cryotron gate means 12 provided with a plurality of cryotron grid means 13, 14, 15 and 16 disposed thereacross and insulated therefrom. The purpose of branch circuit 3 is the diversion of current away from branch 4 when tunnelling junction 5 is substantially non-conductive. Current flowing through grid means 13, 14, 15 and/or 16 introduces resistance in cryotron gate means 12 and therefore into branch 3 in accordance with the number of such grids having an input current applied thereto.

Let it be assumed for purposes of explanation that one constant unit of current is delivered from current source 2 upon coupling conductor 1. Further, let it be assumed that current in cryotron grids 13, 14, 15 and 16 is 0.33 unit, or zero, depending on whether input variable $x_1$, $x_2$, $x_3$ and $x_4$ are respectively one or zero. Also, if one such grid means passes a current of 0.33 unit, a resistance, $r_0$, is produced in gate 12. The resistance produced in gate 12, and therefore the voltage drop for unit current, is then equal to $mr_0$, where $m$ is the number of control grids that pass current.

FIG. 3 represents the current-voltage characteristic for tunnelling junction 5. If the resistance $mr_0$ of cryotron gate 12 and therefore its voltage drop is equal to $V_0$, then some current from current source 2 will flow in tunnelling junction 5. For example $1/10$ of the current is so diverted. When the current value $1/10$ unit flows through tunnelling junction 5 it also flows through cryotron grid means 9, causing gate means 10 and 11 to become resistant. If gate means 10 and 11 control gate currents in gates 10 and 11 of magnitude 0.33, the latter current can be employed as one of the inputs to a next successive threshold circuit in a next level of computer logic. It is, of course, understood the number of input cryotron grids 13–16 and the number of output cryotron gates 10–11 are illustrative only and a greater or lesser number of elements may be employed if desired. It is also understood that diversion of current into branch 4 somewhat reduces the current in branch 3 thereby reducing the voltage drop in branch 3; however, the current diversion is generally small in comparison to the total current and therefore the device's operation as set forth is not affected.

FIG. 4 illustrates a cryotron gate 12' having a number of grids 13', 14', 15' and 16' extending thereacross. At the point where the cryotron grids cross gate 12', gate 12' is arranged to have differing widths depending upon the weighting factor, $a$, which it is desired to give the respective variables $x_1$ through $x_4$. Cryotron gate means 12' corresponds to cryotron gate means 12 in FIG. 2 and may be substituted therefor.

It is understood the circuit according to the present invention is operated in a cryogenic environment wherein the temperature is below that required for rendering all the circuit conductors normally super-conducting in the absence of a magnetic field. Only the current source 2 in FIG. 2 is normally non-superconducting, as are such portions of conducting means 1 leading from the source to the cyrogenic environment.

In accordance with the present invention there is thus provided what may be termed a "cryo-electronic" threshold component. This threshold component is formed from a small number of thin film deposited cryotron devices and a superconducting tunnelling junction. The space requirements for this threshold logic device are almost no greater than the space required for the input and output leads extending thereto. The device is therefore useful in densely packed computer circuitry facilitating the accommodation of numerous logical functions in a small space.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A threshold component comprising first and second conductive branches formed of materials that become superconducting at low temperatures and adapted for refrigeration to such temperatures during operation thereof, said first branch including cryotron gate means having a plurality of cryotron grid means disposed in operating relation thereto, said cryotron gate means being of varying width and operatively associated with respective ones of said cryotron grid means to provide a weighting function to input signals for said threshold component, said second branch including a superconductive tunneling junction and a cryotron grid conductor having a cryotron gate conductor disposed in operative relation thereto, means coupling said first and second branches in parallel, and means providing current to said parallel-connected branches.

References Cited

UNITED STATES PATENTS

| | | | |
|---|---|---|---|
| 3,047,743 | 7/1962 | Brennemann | 307—88.5 |
| 3,116,427 | 12/1963 | Giaever | 307—88.5 |
| 3,178,594 | 4/1965 | Pollack | 307—88.5 |
| 3,191,160 | 6/1965 | Alphonse | 307—88.5 |
| 3,222,544 | 12/1965 | Cheng | 307—88.5 |

OTHER REFERENCES

Pankove, "RCA Technical Note #542" March 1962 (sheets 1 and 2).

JOHN S. HEYMAN, *Primary Examiner.*

ARTHUR GAUSS, *Examiner.*

D. D. FORRER, *Assistant Examiner.*